Figure 6:
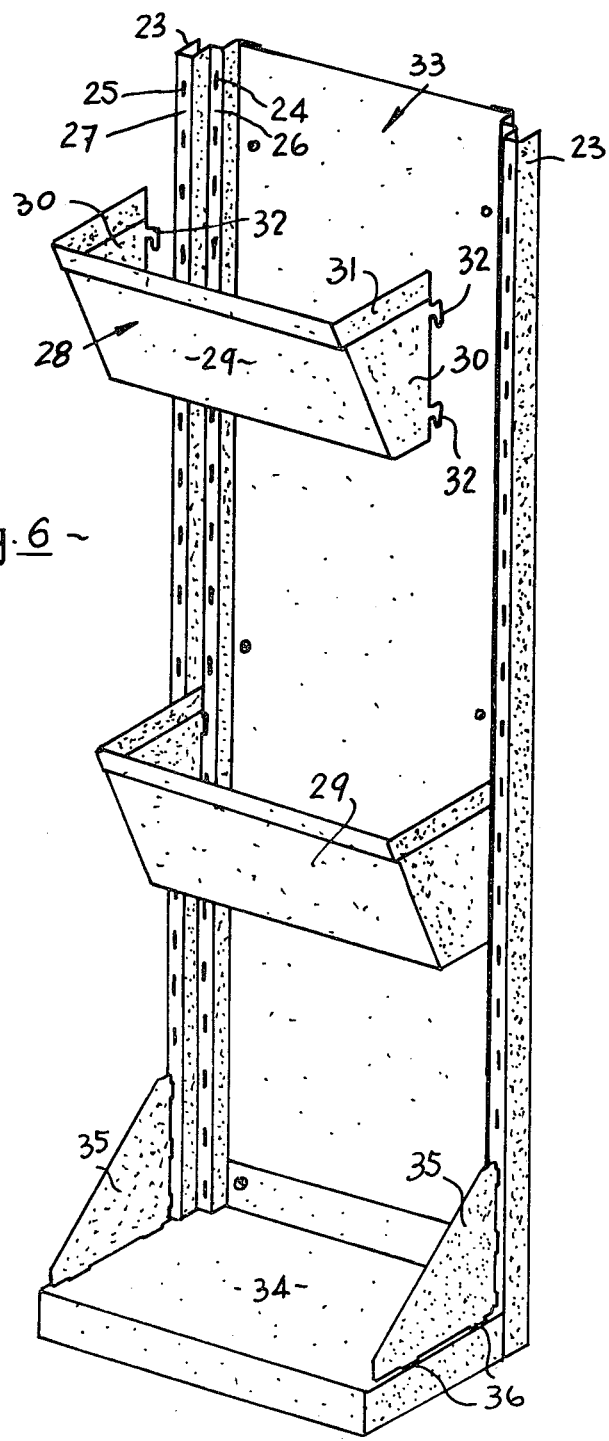

United States Patent [19]

Karpisek

[11] 4,380,136

[45] Apr. 19, 1983

[54] ASSEMBLY KIT FOR A HOLDER FOR GROWTH SUPPORTING MEDIUM

[76] Inventor: Ladislav S. Karpisek, 86 Woodfield Boulevarde, Caringbah, n.s.w, Australia

[21] Appl. No.: 167,725

[22] Filed: Jul. 11, 1980

[51] Int. Cl.³ ............................................. A01G 9/02
[52] U.S. Cl. ......................................... 47/83; 47/66
[58] Field of Search ................ 211/107; 47/39, 82–83, 47/33, 67

[56] References Cited

U.S. PATENT DOCUMENTS

| 21,044 | 9/1891 | Peters | 47/39 X |
|---|---|---|---|
| 2,514,536 | 7/1950 | Burney | 47/83 X |
| 3,030,735 | 4/1962 | Bodkins | 47/83 X |
| 3,389,499 | 6/1968 | Haile | 47/33 |
| 3,664,063 | 5/1972 | Ware | 47/39 |
| 4,051,631 | 10/1977 | Jones | 47/83 X |

FOREIGN PATENT DOCUMENTS

| 1150840 | 1/1958 | France | 47/39 |
|---|---|---|---|
| 2253451 | 7/1975 | France | 47/83 |
| 2386981 | 12/1978 | France | 47/82 |

Primary Examiner—Robert E. Bagwill
Attorney, Agent, or Firm—Emory L. Groff, Jr.

[57] ABSTRACT

A kit of components to be assembled into a holder for a growth supporting medium such as soil. The kit comprises a panel with angled ends with associated first fastening means to engage in second fastening means on two posts joined by a panel which combines with the first panel to define a holding area which decreases in cross-section from top to bottom.

5 Claims, 18 Drawing Figures

U.S. Patent  Apr. 19, 1983  Sheet 1 of 6  4,380,136
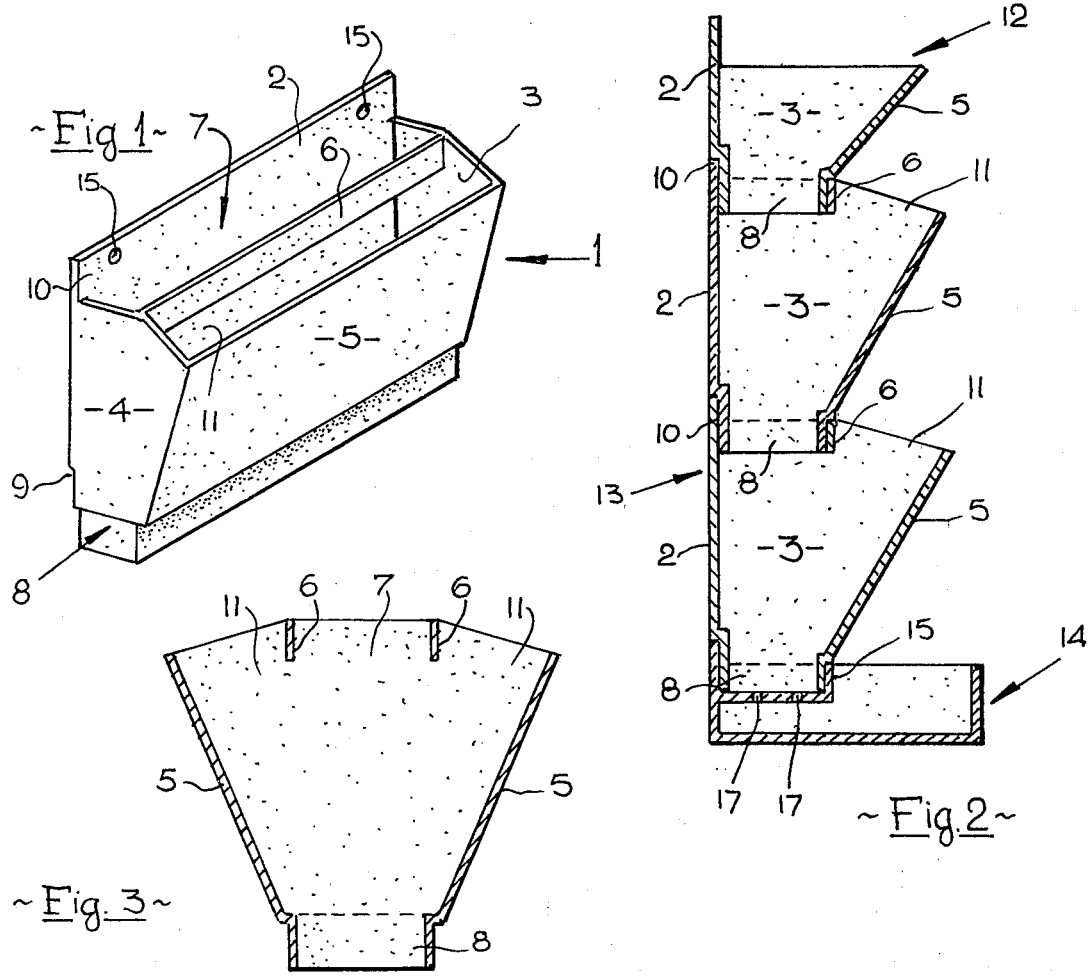
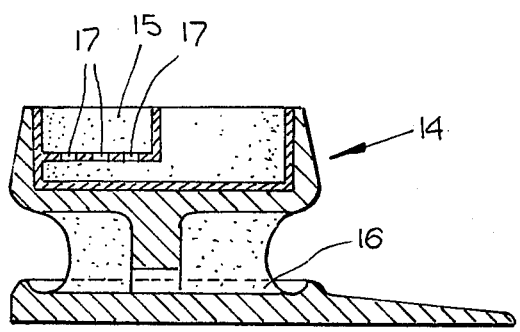
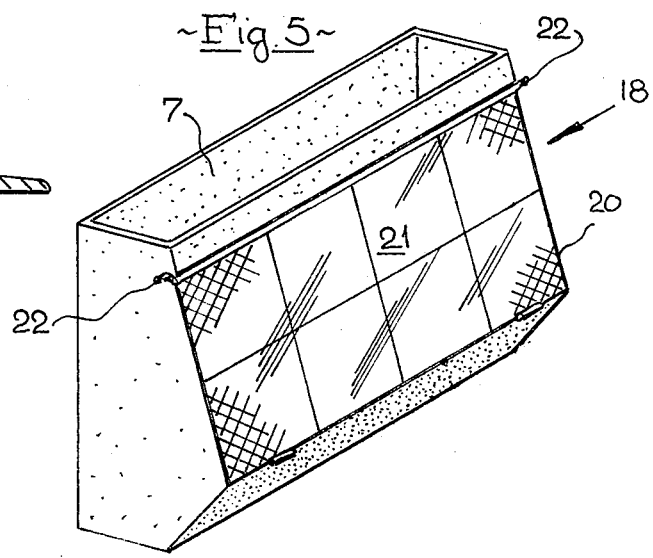

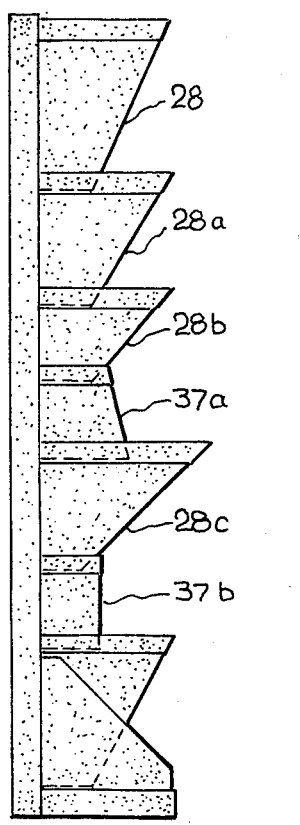
-Fig. 7-
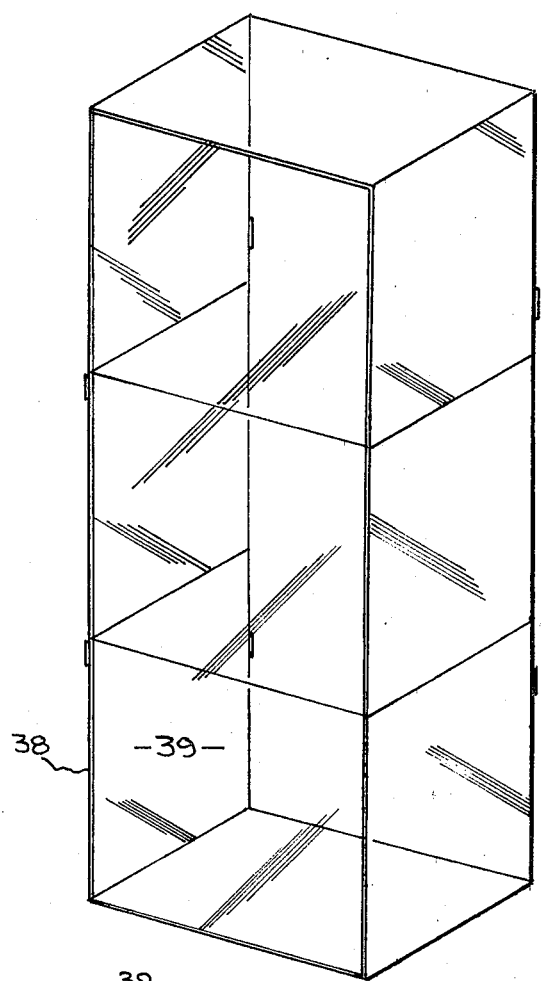
-Fig. 8-
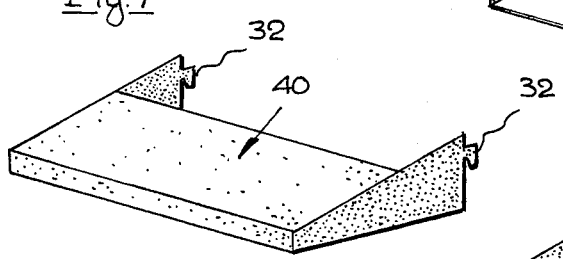
-Fig. 9-
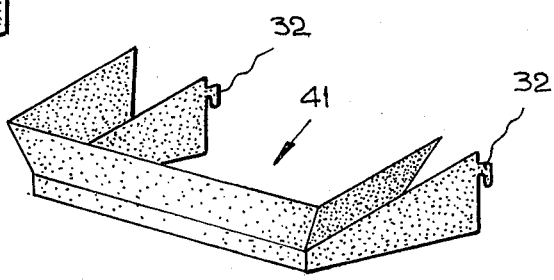
-Fig. 11-
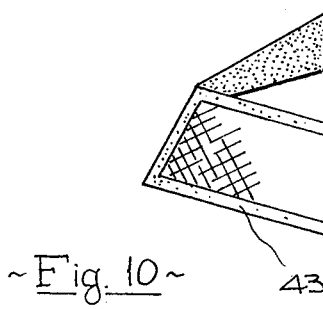
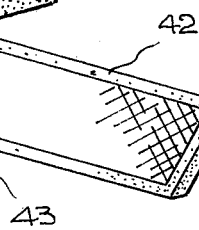
-Fig. 10-

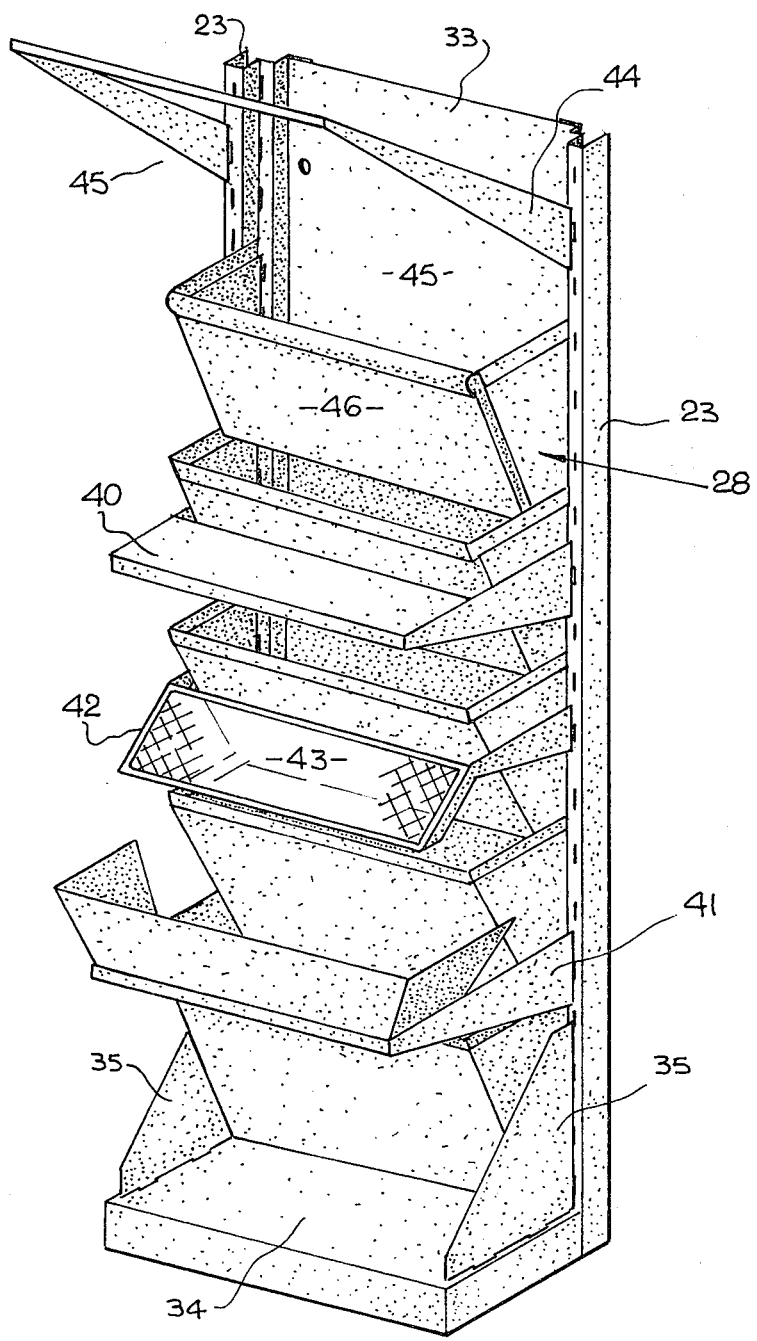
~ Fig. 12 ~

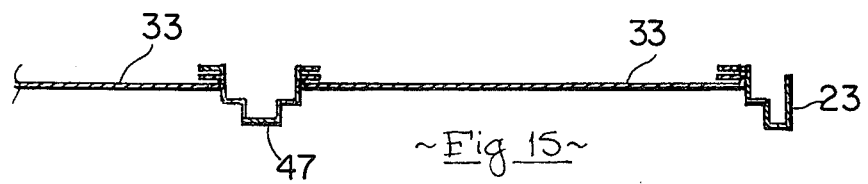
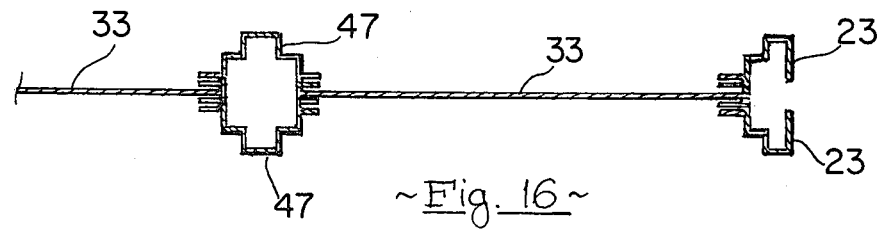
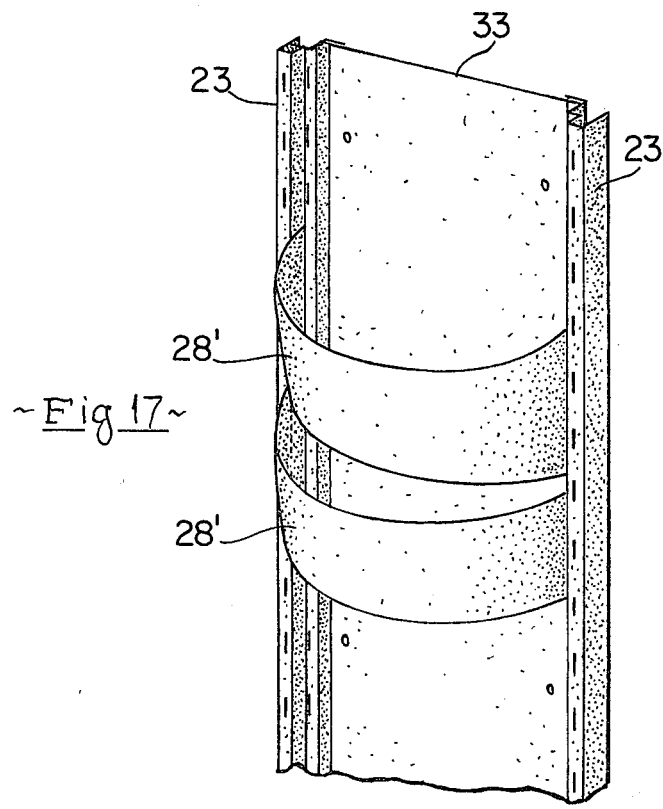
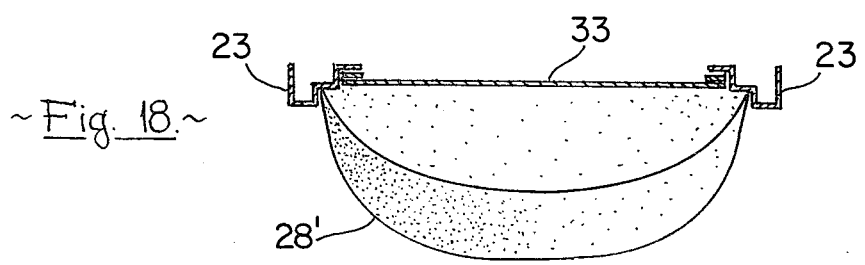

ASSEMBLY KIT FOR A HOLDER FOR GROWTH SUPPORTING MEDIUM

This invention relates to retainers for a growth supporting medium such as soil and tiered assemblies thereof to form gardens developed on a multi-level concept, such gardens are hereinafter called vertical gardens. Such a garden provides many growing areas one above the other, each area being substantially equal to the site area over which the vertical garden is located. As a consequence site areas are more efficiently used each providing a location for a plurality of growing areas (beds) where in normal cultivation a single site area provided a single bed.

As will be readily seen the system will avoid the wastage of site areas as there is no need for paths between beds to allow flowers and/or vegetables to be tended. Unpleasant aspects of gardening are avoided, e.g. bending over the garden beds to remove weeds or otherwise care for the growing plants. The garden beds can be located at levels enabling all such work to be done whilst standing erect.

Vertical gardens as proposed can be mounted against a wall, or can be used as a vertical flower garden to act as a privacy barrier, or a single or multi-sided vertical garden can be used as a free standing architectural feature wall. The possible uses are many and include gardens to raise delicate crops, expensive or exotic crops or just simply flower displays.

It is the object of this invention to provide the means whereby the benefits to be obtained by vertical gardening can be readily achieved.

The invention broadly comprises a kit to assemble into at least one holder for a growth supporting medium such as soil, said kit comprising two posts to be erected in vertical parallel spaced relationship against a backing member, first coupling means on each post spaced apart at regular intervals along the posts, at least one contoured front panel having an upper edge and a lower edge which is shorter than the upper edge, said front panel having a central portion disposed between two end portions, second coupling means on each of said end portions to respectively releasably engage with the first coupling means on the posts to position said end portions in planes at right angles to the plane of the backing member fixed to the cooperating post and to space said central portion from the backing member, said central portion and end portions of the front panel and the backing member providing encircling walls for a soil zone which is open top and bottom and has a smaller cross-sectional area adjacent the front panel lower edge than it has adjacent the front panel edge and a bottom panel to close off the lower end of the lowermost soil zone.

Figure 13:
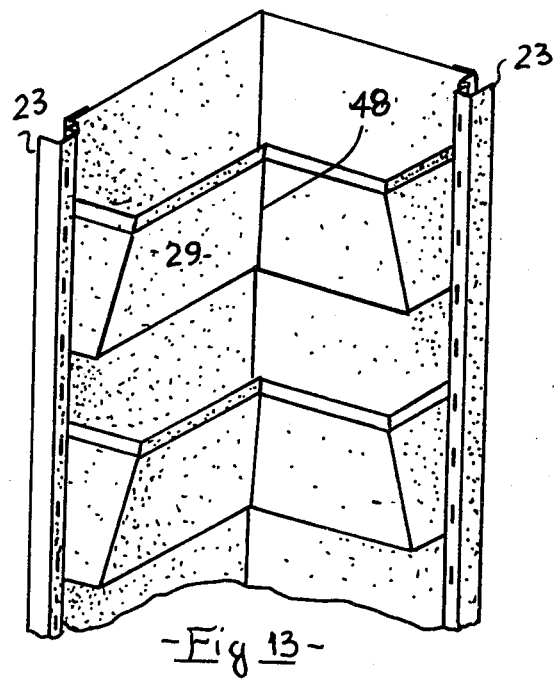
Figure 14:
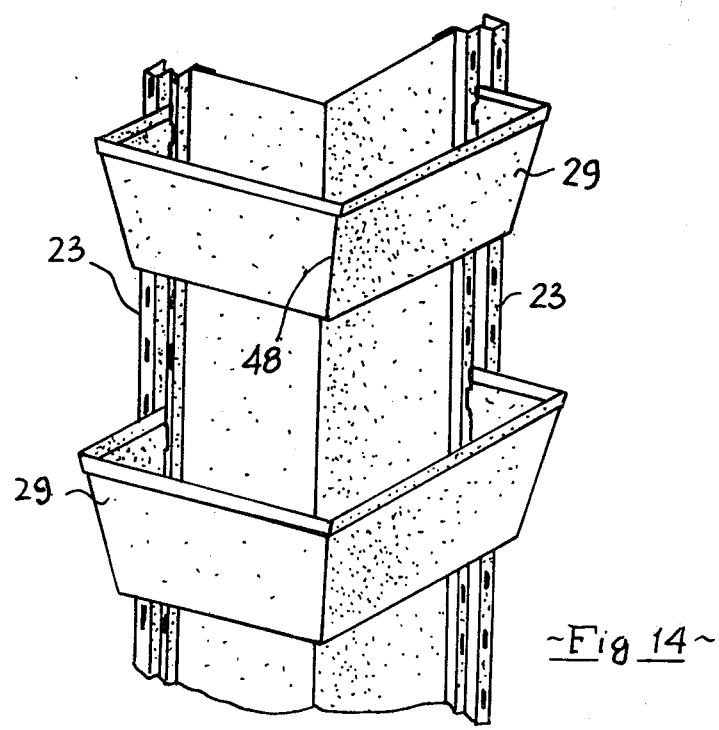

The invention will be readily understood from the following description of several embodiments which are related to the drawings in which:

FIG. 1 is a perspective view of one embodiment of the invention which is a multi-sided box like retainer for soil or like medium in which plants can be grown, FIG. 2 is a sectional end view of several retainers of the type shown in FIG. 1 assembled to form a vertical garden, FIG. 3 is sectional end view of another form of retainer, FIG. 4 is a sectional end view of a bottom or foot member for an assembly as illustrated in FIG. 2, FIG. 5 is a perspective view of another embodiment of the retainer of the invention, FIG. 6 is a perspective view showing a simplified construction in which the retainer is a folded sheet metal member, FIG. 7 is an end view showing a vertical garden made up of members as illustrated in FIG. 6 and other components, FIG. 8 illustrates an attachment for the garden as in FIG. 7, FIG. 9 illustrates an attachment for the garden as in FIG. 7, FIG. 10 illustrates an attachment for the garden as in FIG. 7, FIG. 11 illustrates an attachment for the garden as in FIG. 7, FIG. 12 is a view similar to the view of FIG. 7 showing the attachments of FIGS. 8, 9, 10 and 11 in use and a further attachment, FIG. 13 shows a modified form of retainer for corner locations, FIG. 14 shows a modified form of retainer for corner locations, FIG. 15 illustrates end and joining posts whereby horizontal rows of retainers can be formed, FIG. 16 illustrates how back to back gardens can be formed with horizontal rows of retainers, FIG. 17 illustrates a variation of the general form of retainer illustrated in FIG. 6, and FIG. 18 illustrates a variation of the general form of retainer illustrated in FIG. 6.

The several forms of the invention will now be described. Considering first the concept involved, this can be seen from FIGS. 1 and 2 where there is illustrated a multi-sided box like retainer 1 which comprises a back 2, ends 3 and 4, a front 5 (inclined to the vertical) and a divider 6 connecting the ends 3 and 4.

The sides 2, 3, 4 and 5 define a compartment, which is open at the top and bottom, to house a growing medium hereinafter called soil. The internal cross-sectional area of the open top of the box is greater than that of the bottom. The divider 6 provides a socket 7 at the top to receive a parallel sided bottom part 8 of another box. Boxes are superimposed to form a garden as shown in FIG. 2. The box back 2 is recessed as at 9 to accept the upstanding flange 10 of the back 2 of another box. The remainder of the top area of the box provides a cultivation zone 11. If desired the divider 6 may be omitted and lugs added to laterally retain the bottom of an upper box.

The FIG. 2 arrangement illustrates several boxes (as described above) superimposed to provide a vertical garden and a top box 12, with no divider 6. The assembled garden 13 sits on a bottom member 14, which in this case also serves as a collector for excess water after it passes through the garden from a trough supported above and discharging at a controlled rate into top box 12. The concept is readily understood from the foregoing. Holes 15 in the backs 2 are provided to allow tiered boxes to be connected by connecting means to a post or posts or a wall or the like.

An alternate form of box is shown in FIG. 3. This box has a socket 7 between two bars 6 and two cultivation zones 11.

The bottom 14 may be developed into a foot assembly (see FIG. 4) having socket 15 to receive part 8 of the lowermost box and a bait tray 16 for snail and slug bait. The socket 15 includes drain holes 17.

In a development of the foregoing the configuration is varied as shown in FIG. 5 to provide an enlarged cultivation zone 18. To prevent soil loss a hinged grid door 20 is provided together with an underlay of, for example, plastics material indicated 21. A catch 22 is provided to retain the door 20 closed.

Planting involves puncturing the plastic 21 to insert a seedling or seed in the soil therebeneath.

From a commercial viewpoint simplicity of design and economy of manufacture without loss of efficiency are the primary aims. These considerations have lead to the development of the embodiments now to be described. FIG. 6 illustrates an arrangement in which there are two posts 23 of folded sheet metal. Along the length of the posts at regular intervals there are slots 24 and 25 respectively positioned in steps 26 and 27 of the post profile. The retainers 28 are made of folded shet metal having a front 29 and ends 30 has a generally U-shape. There is a stepped flange 31 around the top edge of the retainer and there are hooks 32 to enable the retainer to be hooked into post slots 24. The posts are joined by a panel 33. This panel backing member is not essential when the garden is to be mounted to a brick wall or other surface serving as a backing member where dampness from the soil in the vertical garden is not a consideration.

Alternatively, the assembly 23-33-23 can be made as a single item i.e. formed from a single piece of metal. The bottom member 34 is preferably mounted by engagement of hooks on the bottom 34 in slots 25, but may be otherwise connected. The bracing plates 35 are preferably mounted as shown i.e. by engaging hooks on the plates 35 in post slots 25 and slots 36 in the bottom member.

FIGS. 6 and 7 provide a clear illustration of the various forms of retainers and useful attachments for a vertical garden of this invention. In FIG. 7 there are three depths of retainer, identified 28, 28a and 28b and a different shaped retainer 28c to give a wider cultivation zone. Connecter members 37a and 37b of two different shapes are shown. All of the foregoing are shaped to have the length dimension of the bottom parts of the members fit into the enlarged length dimension of the upper parts of lower member, the enlargement being due to the provision of stepped flange 31. The slots 25 are used to support ancillary items as shown in FIGS. 8 to 11, such as a wire grid 38 covered with plastic 39 to provide wind protection and if required hot house conditions, a work bench 40 to support posts, tools etc. whilst working on the garden, a soil trough 41 to hold soil whilst removing or adding soil to a box and a sunshield 42 having a light filtering unit 43. The foregoing ancillary items are shown in use in FIG. 12 together with a frame 44 with strings 45 to train climbing plants such as climbing beans or peas. Also illustrated is a thermal barrier 46 to prevent the sun overheating the front of a box. Such heat could pass through the front of the box to the soil and be too severe for the roots of the plants in the box. The barrier also prevents burning of foilage of lower plants which might contact a sun heated front surface of an upper metal box. The barrier could desirably be made of foamed polystyrene.

FIGS. 13 and 14 illustrate modified retainers where the front panels 29 have tranverse folds 48 to permit the retainers to be mounted in internal or on external corners so the parts of the front panel to either side of the fold line 46 lie substantially parallel to the walls joining at the corner.

FIG. 15 illustrates a post 23 as before described linked to a joiner post 47, which is in effect a double post 23. By means of such posts and panels 33 horizontal rows of retainers can be formed. In this way a vertical garden wall can be made. FIG. 16 develops the arrangement of FIG. 15 to permit a double sided vertical garden wall to be formed.

FIGS. 17 and 18 illustrate a variation 28' the folded metal retainer concept as illustrated in FIG. 6.

It will be clear that such constructions can be readily made by plastics moulding techniques as well as by conventional fabrication techniques.

I claim:

1. A kit to assemble into at least one holder for a growth supporting medium such as soil, said kit comprising a backing member and two posts to be erected in vertical parallel spaced relationship against said backing member, first coupling means on each post spaced apart at regular intervals along the posts, at least one contoured front panel having an upper edge and a lower edge which is shorter than the upper edge, said front panel having a central portion disposed between two end portions, second coupling means on each of said end portions to respectively releasably engage with the first coupling means on the posts to position said end portions in planes at right angles to the plane of the backing member fixed to the cooperating post and to space said central portion from the backing member, said central portion and end portions of the front panel and the backing member providing encircling walls for a soil zone which is open top and bottom and has a smaller cross-sectional area adjacent the front panel lower edge than it has adjacent the front panel upper edge and a bottom panel to close off the bottom of a selected soil zone.

2. A kit as claimed in claim 1 wherein the front panel is curved along its length.

3. A kit as claimed in claim 1 wherein, the central portion of the front panel is straight and the end portions of the front panel are straight and lie respectively in planes at right angles to the plane of the central portion at its junction with each end portion and with the length of the central portion upper edge being the same as that of the central portion lower edge.

4. A kit as claimed in claim 3 including an outwardly stepped flange along the upper edge of the panel.

5. A kit as claimed in claim 3 including, a fold line vertically across the front portion to form two angularly disposed sub-portions.

* * * * *